United States Patent [19]

Joormann et al.

[11] Patent Number: 4,573,762
[45] Date of Patent: Mar. 4, 1986

[54] GERMANIUM-FREE OPTICAL FIBERS HAVING LARGE NUMERICAL APERTURES

[75] Inventors: Hendrik J. M. Joormann; Gijsbertus A. C. M. Spierings, both of Eindhoven, Netherlands

[73] Assignee: U.S. Philips Corporation, New York, N.Y.

[21] Appl. No.: 508,429

[22] Filed: Jun. 27, 1983

[51] Int. Cl.$^4$ .......................... G02B 6/00; G02B 6/18
[52] U.S. Cl. .................................. 350/96.34; 350/96.31
[58] Field of Search ............... 350/96.34, 96.29, 96.31

[56] References Cited

U.S. PATENT DOCUMENTS

| | | | |
|---|---|---|---|
| 4,264,131 | 4/1981 | Sawamura et al. | 350/96.34 |
| 4,265,667 | 5/1981 | Ikeda et al. | 350/96.34 |
| 4,367,012 | 1/1983 | Ikeda et al. | 350/96.34 |
| 4,418,985 | 12/1983 | Kasori et al. | 350/96.34 |

FOREIGN PATENT DOCUMENTS

| | | | |
|---|---|---|---|
| 0003352 | 1/1978 | Japan | 350/96.34 |
| 0148812 | 11/1979 | Japan | 350/96.34 |
| 55-154342 | 12/1980 | Japan | 350/96.34 |

*Primary Examiner*—William L. Sikes
*Assistant Examiner*—Akm E. Ullah
*Attorney, Agent, or Firm*—Marc D. Schechter

[57] ABSTRACT

An optical fiber of germanium-free, multicomponent glasses has a core glass which has the molecular composition: $SiO_2$: 57.5–65%; $(ZrO_2 + \frac{1}{2}Y_2O_3)$: 0–5%; $(MgO + CaO + SrO + BaO + ZnO)$: 12.5–27.5 where MgO: 0–5%, CaO: 0–10%, SrO: 0–7.5%, BaO: 0–15% ZnO: 0–20%, and in which if no BaO is present, the ZnO content is 12.5–20%, and if no ZnO is present, the BaO content is 5–15%, and $(Li_2O + Na_2O + K_2O)$: 10–25%. The core glass has a $K_2O$ content which is preferably smaller than half of the total alkali metal oxide content. The cladding glass consists of a silicate glass or a borosilicate glass having a refractive index which is at least 2% lower than the refractive index of the core glass. The viscosity of the cladding glass at the processing temperature is 0.5 to twice the viscosity of the core glass expressed in Pa.s.

11 Claims, No Drawings

GERMANIUM-FREE OPTICAL FIBERS HAVING LARGE NUMERICAL APERTURES

BACKGROUND OF THE INVENTION

The invention relates to optical fibers having large numerical apertures. The fibers consist of multicomponent glasses. The optical fibers may be of the so-called multimode, stepped index type or of the graded index type.

Optical fibres having a large numerical aperture, i.e. approximately 0.30 or larger, usually comprise at least in the core glass germanium dioxide. Germanium dioxide is a comparatively expensive component. In addition, such a fiber is sensitive to high energy radiation due to the comparatively high germanium content. This results in an increase in the attenuation of an irradiated fiber. The increased attenuation only partly disappears after the irradiation ceases.

SUMMARY OF THE INVENTION

It is an object of the invention to provide optical fibers having large numerical apertures from multicomponent glasses which do not contain germanium dioxide. At least the core glass contains no boron oxide. This requires a good adaptation of melting temperature and viscosity at the processing temperature of the multicomponent glasses used. In addition it is necessary for the glasses used to have a small tendency to crystallization or phase separation.

According to the invention, these objects can be achieved by optical fibers in which the core glass has the molecular composition: 57.5–65% $SiO_2$, 0–5% ($ZrO_2 + \frac{1}{2}Y_2O_3$), 10–25% ($Li_2O + Na_2O + K_2O$), 12.5–27.5% ($MgO + CaO + ZnO + SrO + BaO$), where MgO: 0–5%, CaO: 0–10%, SrO: 0–7.5%, BaO: 0–15%, ZnO: 0–20%, and in which, if no BaO is present, the ZnO content is 12.5–20% and, if no ZnO is present, the BaO content is 5–15%. The cladding glass consists of a silicate glass or a borosilicate glass having a refractive index which is at least 2% lower than the refractive index of the core glass. The viscosity of the cladding glass at the processing temperature is 0.5 to 2 times the viscosity of the core glass expressed in Pascal-seconds (Pa.s).

It has been found that in the case in which the cladding glass satisfies the imposed requirements, stepped index fibres and graded index fibres having numerical apertures exceeding 0.30 can be obtained by, for example, the known double crucible method.

In the range of compositions indicated for the core glass, the glasses have a melting temperature between 1250° and 1400° C., a refractive index between 1.550 and 1.595, and a viscosity at 1100° C. between 30 and 100 Pa.s.

Preferably, if $K_2O$ is present, the content thereof is less than half of the total alkali metal oxide content of the core glass. The tendency to crystallize or undergo phase separation upon slow cooling of the core glass is suppressed by this measure. The same applies to cladding glass A described hereinafter.

Examples of suitable cladding glasses are glasses of the following molecular compositions.

A. $SiO_2$ 60–67.5%
   ($ZnO + CaO + MgO$) 10–25%, in which CaO: 0–5%, MgO: 0–10% and ZnO: 0–10%,
   ($Li_2O + Na_2O + K_2O$) 10–25%

B. $SiO_2$ 55–67.5%,
   $Al_2O_3$ 0–7.5%,
   ($ZnO + CaO + MgO$) 10–15%, in which CaO: 0–7.5%, MgO: 0–15% and ZnO: 0–10%,
   $B_2O_3$ 5–15%,
   ($Li_2O + Na_2O + K_2O$) 10–25%.

Within the composition range A, glasses have a melting temperature between 1300° and 1400° C., a refractive index between 1.535 and 1.540, and a viscosity at 1100° C. between 70 and 200 Pa.s. Within the composition range B, glasses have a melting temperature between 1200° and 1400° C., a refractive index between 1.503 and 1.520, and a viscosity at 1100° C. between 15 and 250 Pa.s.

Cladding glasses of the composition A have the advantage of having only a small absorption at wavelengths exceeding 1.3 μm. This is in contrast to cladding glasses of composition B which absorb above 1.3 μm as a result of the presence of boron. However, the latter glasses have a lower melting temperature, a lower viscosity and as a result of this produce a fiber with better tensile strength and generally a lower refractive index than cladding glasses of composition A. As a result, a lower refractive index core glass can be used to achieve the same numerical aperture.

The following may be noted with respect to the multicomponent glasses which may be used according to the invention in multimode, stepped index and graded index fibers of large numeral aperture.

With $SiO_2$ contents less than 57.5 mol.% for the core glass, less than 60 mol.% for the cladding glass A and less than 55 mol.% for the cladding glass B, the tendency to crystallize and undergo phase separation, which causes the Rayleigh scattering to increase, rapidly increases. With $SiO_2$ contents more than 65 mol.% for the core glass and more than 67.5 mol.% for the cladding glass, the melting temperature becomes higher than 1400° C. so that the processibility of the glasses decreases.

In the glass compositions which are used according to the invention in optical fibers, ZnO and MgO improve the corrosion resistance. MgO has a small effect on the refractive index as compared with CaO, ZnO, SrO and BaO, but it causes the light scattering to increase. This is why MgO is preferably used in the core glass only in a quantity up to at most 5 mol.%. With quantities exceeding 10 mol.% in cladding glass A and 15 mol.% in cladding glass B, the melting temperature becomes too high for use in optical fibers, while the light scattering also increases.

CaO, ZnO, SrO and BaO have a refractive index increasing effect. ZnO is particularly suitable because it causes the Rayleigh scattering to increase only slightly or not to increase at all with increase in concentration. With concentrations larger than those indicated above, however, the tendency to crystallize rapidly increases.

In cladding glass B, the lowest refractive index is obtained when ZnO and CaO are absent and only MgO is present. ZnO and CaO contents of the indicated percentages in the cladding glass B lead to a higher refractive index, but the corrosion resistance is also improved thereby.

The alkali metal oxides reduce the melting temperature and so improve the meltability of the glasses. However, they reduce the corrosion resistance as their content increases, which is why at most 25 mol.% is added. The total alkali metal oxide contents in mol.% of the core glass and of the cladding glass are preferably equal.

In these circumstances galvanic cells which might give rise to bubble formation in the double crucible cannot be formed in a platinum crucible when the glasses contact each other.

Exchange of alkali metal ions between the core glass and the cladding glass during the manufacture of optical fibers according to the invention can be prevented by chosing the concentrations of each of the alkali metal oxides present in the core glass and in the cladding glass to be equal. In a preferred embodiment of the invention the overall alkali metal concentration is 15 mol.%, of which $Li_2O$: 3 mol.%, $Na_2O$: 6 mol.% and $K_2O$: 6 mol.%. With this composition, the glass has a minimum melting temperature with a maximum corrosion resistance.

Exchange of alkaline earth metal ions will occur with an optically noticeable effect only if the contact time between the core glass and the cladding glass at the processing temperature is sufficiently long.

An $Al_2O_3$ content exceeding 7.5 mol.% in the cladding glass B leads to an increase in the melting temperature to above the limit of 1400° C. A $B_2O_3$ content smaller than 5 mol.% in cladding glass B leads to a melting temperature higher than 1400° C. This applies in particular to glasses with 15 mol.% $K_2O$. $B_2O_3$ contents exceeding 15 mol.% leads to a glass having too small a corrosion resistance.

The quantity of $(ZrO_2 + \frac{1}{2}Y_2O_3)$ is preferably 0–3 mol.%. In the indication of the concentration $\frac{1}{2}Y_2O_3$ is used because $\frac{1}{2}$ gram mol. $Y_2O_3$ is comparable with 1 gram mol. $ZrO_2$ as regards the number of gram atoms of yttrium and zirconium. $ZrO_2$ and/or $Y_2O_3$ are used in the core glass if a large numerical aperture is desired, and if the permissible quantities of BaO, CaO, SrO and/or ZnO are not sufficient to reach the desired refractive index. In particular when $ZrO_2$ is used together with the alkaline earth metal oxides CaO and SrO or together with ZnO, a synergistic effect appears to occur which is expressed in an extra increase of the refractive index above the increase which can be expected from the $ZrO_2$ concentration alone, as appears from the following Table.

TABLE

| Quantities in mol. % | | | | | | | |
|---|---|---|---|---|---|---|---|
| $SiO_2$ | $ZrO_2$ | CaO | SrO | ZnO | BaO | Alkali metal ox.5 $Li_2O$, 10 $Na_2O$, 10 $K_2O$ | n |
| 75 | | | | | | 25 | 1.5029 |
| 70 | 5 | | | | | 25 | 1.5337 |
| 62.5 | | 12.5 | | | | 25 | 1.5348 |
| 62.5 | | | 12.5 | | | 25 | 1.5349 |
| 62.5 | | | | 12.5 | | 25 | 1.5332 |
| 62.5 | | | | | 12.5 | 25 | 1.5552 |
| 57.5 | 5 | 12.5 | | | | 25 | 1.5688 |
| 57.5 | 5 | | 12.5 | | | 25 | 1.5723 |
| 57.5 | 5 | | | 12.5 | | 25 | 1.5710 |
| 57.5 | 5 | | | | 12.5 | 25 | 1.5860 |

As appears from the Table, replacement of 5 mol.% $SiO_2$ by 5 mol.% $ZrO_2$ causes the refractive index in an alkali metal silicate glass to increase by 0.0308. In an alkali metal silicate glass which also comprises CaO, SrO or ZnO, the increase when replacing 5 mol.% $SiO_2$ by 5 mol.% $ZrO_2$, however, is 0.0340, 0.0374 and 0.0378, respectively.

For comparison, compositions with BaO are also recorded in which the increase proves to be the expected 0.0308.

Similar effects occur when $Y_2O_3$ is used. This latter oxide also improves the corrosion resistance of the core glass, while the crystallization tendency remains low.

During the preparation of the glasses, the usual refining agents, for example $As_2O_3$ and $Sb_2O_3$ may be used. Quantities up to 1 mol.% of $As_2O_3$ and/or $Sb_2O_3$ are preferably added to the above-mentioned compositions. It has been found that in practice this also leads to a lower damping, in particular at 850 nm.

The glasses can be prepared, for example, as follows. Starting materials are carbonates and/or nitrates of alkali metals, oxides, carbonates or nitrates of Mg, Ca, Sr, Ba, and Zn, and $SiO_2$, $B_2O_3$ (and/or $H_3BO_3$), $ZrO_2$ (and/or $ZrSiO_4$), $Y_2O_3$ and $Al_2O_3$. Materials of the best possible purity are always used. This means that the level of impurities which absorb in the wavelength ranges of interest is, if possible, smaller than 0.01 parts per million (ppm).

The glass melts are kept at a temperature above the melting point for some time (for example 1 to 10 hours). Dry gases, for example oxygen, carbon monoxide or carbon dioxide, saturated or not saturated with $D_2O$, can be blown through the melt for some time. Rods are drawn from the melts. The rods serve as a starting material for the manufacture of optical fibres.

The optical fibers can be manufactured in the known manner, for example by a double crucible method. If desired, a second cladding of a particularly corrosion resistant glass may be provided by using an extra crucible.

Depending on the distance between the outflow apertures of the two crucibles in a double crucible, exchange of alkaline earth metal ions will occur between the core and the cladding glass and a graded index fiber can be obtained. Exchange may occur, for example, between the ions of one or more of the alkaline earth metals Ba, Sr, and Ca and Zn (core glass) and the magnesium ion (cladding glass). At processing temperatures between 1000° and 1200° C., the distance must be larger than 500 nm. With smaller distances, the contact time for an optically noticeable ion exchange is too small.

The invention will now be described in greater detail with reference to the following specific examples.

EXAMPLE 1

An optical fiber was manufactured by means of a double crucible method from glasses of the following molecular composition:

| Core glass: | | Cladding glass: | |
|---|---|---|---|
| 60% | $SiO_2$ | 62.5% | $SiO_2$ |
| 2.5% | ($\frac{1}{2}Y_2O_3$) | 10% | ZnO |
| 5% | ZnO | 2.5% | CaO |
| 5% | CaO | 10% | MgO |
| 12.5% | BaO | 3% | $Li_2O$ |
| 3% | $Li_2O$ | 6% | $Na_2O$ |
| 6% | $Na_2O$ | 6% | $K_2O$ |
| 6% | $K_2O$ | | |

The glasses had the following properties.

| | Core | Cladding |
|---|---|---|
| Melting temperature | 1350° C. | 1400° C. |
| Refractive index | 1.582 | 1.5366 |
| Viscosity (1100° C.) | 40 Pa · s. | 80 Pa · s. |

The glasses were heated in a double crucible up to a temperature of 1100° C. An optical fiber having the following properties was drawn.

core diameter: 200 μm
 fiber diameter: 250 μm
 numerical aperture: 0.37
 Rayleigh scattering at 850 nm: 2.8 dB.km$^{-1}$
 damping at 850 nm: 11 dB/km.

EXAMPLE 2

An optical fiber was manufactured with the same core glass as in Example 1, except that 2.5 mol.% $ZrO_2$ was used instead of 1.25 mol.% $Y_2O_3$ (viscosity (1100° C.) 40 Pa.s.). However, the cladding glass had the following molecular composition.

| | |
|---|---|
| $SiO_2$ | 57.5% |
| $Al_2O_3$ | 2.5% |
| MgO | 12.5% |
| $B_2O_3$ | 12.5% |
| $Li_2O$ | 3% |
| $Na_2O$ | 6% |
| $K_2O$ | 6% |

The melting temperature of the cladding glass was 1250° C. Its refractive index was 1.519, and its viscosity was (1100° C.) 43 Pa.s.

An optical fiber was manufactured by heating the glasses at 1100° C. in a double crucible, and then drawing a fiber of the following dimensions:

core diameter: 200 μm
 fiber diameter: 250 μm

The damping at 850 nm was 13.7 dB.km$^{-1}$, and the numerical aperture was 0.45.

The Rayleigh scattering at 850 nm was 6.4 dB.km$^{-1}$. The higher damping as compared to Example 1 was caused by the use of comparatively impure $ZrO_2$ (0.1 ppm Cu, 0.1 ppm Ni).

EXAMPLE 3

In the manner as indicated in Example 1, an optical fiber (core diameter 200 μm, fiber diameter 250 μm) was manufactured.

| Core glass (mol. %): | | Cladding glass (mol. %): | |
|---|---|---|---|
| $SiO_2$ | 57.5 | $SiO_2$ | 57.5 |
| ZnO | 17.5 | $Al_2O_3$ | 2.5 |
| CaO | 2.5 | MgO | 12.5 |
| BaO | 7.5 | $B_2O_3$ | 12.5 |
| $Li_2O$ | 3 | $Li_2O$ | 3 |
| $Na_2O$ | 6 | $Na_2O$ | 6 |
| $K_2O$ | 6 | $K_2O$ | 6 |

The glasses had the following properties.

| | Core | Cladding |
|---|---|---|
| Melting temperature | 1250° C. | 1250° C. |
| Refractive index | 1.5701 | 1.519 |
| Viscosity (1100° C.) | 33 Pa · s. | 43 Pa · s. |

The damping at 850 nm was 11 dB.km$^{-1}$, and the numerical aperture was 0.40. The Rayleigh scattering was 4.6 dB.km$^{-1}$ at 850 nm. In this experiment comparatively impure ZnO was used (with 0.03 ppm Cu and 0.01 ppm Ni).

EXAMPLE 4

An optical fiber (core diameter 200 μm, fiber diameter 250 μm) was manufactured in the manner as described in Example 1.

| Core glass (mol. %): | | Cladding glass (mol. %): | |
|---|---|---|---|
| $SiO_2$ | 62.5 | $SiO_2$ | 57.5 |
| ZnO | 17.5 | $B_2O_3$ | 15 |
| CaO | 5 | MgO | 12.5 |
| $Li_2O$ | 3 | $K_2O$ | 15 |
| $Na_2O$ | 6 | | |
| $K_2O$ | 6 | | |

The glasses had the following properties.

| | Core | Cladding |
|---|---|---|
| Melting temperature | 1300° C. | 1300° C. |
| Refractive index | 1.5553 | 1.503 |
| Viscosity (1100° C.) | 85 Pa · s. | 89 Pa · s. |

The damping at 850 nm was 9 dB.km$^{-1}$. The numerical aperture was 0.39. In this case also comparatively impure ZnO was used (0.03 ppm Cu, 0.01 ppm Ni). The Rayleigh scattering at 850 nm was 3.6 dB.km$^{-1}$.

If the cladding glass according to Example 2 was used, a fiber having a numerical aperture of 0.32 was obtained.

What is claimed is:

1. A germanium-free optical fiber comprising a core and a cladding surrounding the core, characterized in that:

the core consists essentially of a glass having a refractive index and a viscosity, and having the molecular composition:
 57.5–65% $SiO_2$;
 0–5% of at least one of the group consisting of $ZrO_2$ and $\frac{1}{2}Y_2O_3$;
 10–25% of at least one of the group consisting of $Li_2O$, $Na_2O$, and $K_2O$; and
 12.5–27.5% of at least one of the group consisting of MgO, CaO, SrO, BaO, and ZnO, but with no more than 5% MgO, 10% CaO, 7.5% SrO, 15% BaO, and 20% ZnO, and provided that if there is no BaO, then not less than 12.5% ZnO, and if there is no ZnO, then not less than 5% BaO; and
 the cladding consists essentially of a silicate glass having a refractive index which is at least 2% lower than the refractive index of the core glass, said cladding glass having a viscosity which is 0.5–2.0 times the viscosity of the core glass at a temperature at which the optical fiber is processed, said cladding glass having the composition:
 60–67.5% $SiO_2$;
 10–25% of at least one of the group consisting of ZnO, CaO, and MgO, but with no more than 10% ZnO, 5% CaO, and 10% MgO, and
 10–25% of at least one of the group consisting of $Li_2O$, $Na_2O$, and $K_2O$.

2. An optical fiber as claimed in claim 1, characterized in that the $K_2O$ content of the core glass is less than half the total alkali metal oxide content of the core glass.

3. An optical fiber as claimed in claim 2, characterized in that the alkali metal oxide content of the core glass is equal to the alkali metal oxide content of the cladding glass.

4. An optical fiber as claimed in claim 3, characterized in that the alkali metal oxide contents of both the core and cladding glasses is 15%.

5. An optical fiber as claimed in claim 4, characterized in that both the core and cladding glasses contain 3% $Li_2O$, 6% $Na_2O$, and 6% $K_2O$.

6. A germanium-free optical fiber comprising a core and a cladding surrounding the core, characterized in that:

the core consists essentially of a glass having a refractive index and a viscosity, and having the molecular composition:
57.5–65% $SiO_2$;
0–5% of at least one of the group consisting of $ZrO_2$ and $\frac{1}{2}Y_2O_3$;
10–25% of at least one of the group consisting of $Li_2O$, $Na_2O$, and $K_2O$; and
12.5–27.5% of at least one of the group consisting of MgO, CaO, SrO, BaO, and ZnO, but with no more than 5% MgO, 10% CaO, 7.5% SrO, 15% BaO, and 20% ZnO, and provided that if there is no BaO, then not less than 12.5% ZnO, and if there is no ZnO, then not less than 5% BaO; and the cladding consists essentially of a borosilicate glass having a refractive index which is at least 2% lower than the refractive index of the core glass, said cladding glass having a viscosity which is 0.5–2.0 times the viscosity of the core glass at a temperature at which the optical fiber is processed, said cladding glass having the composition:
55–67.5% $SiO_2$;
0–7.5% $Al_2O_3$;
10–15% of at least one of the group consisting of ZnO, CaO, and MgO, but with no more than 10% ZnO and 7.5% CaO;
5–15% $B_2O_3$; and
10–25% of at least one of the group consisting of $Li_2O$, $Na_2O$, and $K_2O$.

7. An optical fiber as claimed in claim 6, characterized in that the $K_2O$ content of the core glass is less than half the total alkali metal oxide content of the core glass.

8. An optical fiber as claimed in claim 7, characterized in that the alkali metal oxide content of the core glass is equal to the alkali metal oxide content of the cladding glass.

9. An optical fiber as claimed in claim 8, characterized in that the alkali metal oxide contents of both the core and cladding glasses is 15%.

10. An optical fiber as claimed in claim 9, characterized in that both the core and cladding glasses contain 3% $Li_2O$, 6% $Na_2O$, and 6% $K_2O$.

11. A germanium-free optical fiber comprising a core and a cladding surrounding the core, characterized in that:

the core consists essentially of a glass having a refractive index and a viscosity, and having the molecular composition:
57.5–65% $SiO_2$;
greater than 0 but less than 5% of at least one of the group consisting of $ZrO_2$ and $\frac{1}{2}Y_2O_3$;
10–25% of at least one of the group consisting of $Li_2O$, $Na_2O$, and $K_2O$; and
12.5–27.5% of at least one of the group consisting of MgO, CaO, SrO, BaO, and ZnO, but with no more than 5% MgO, 10% CaO, 7.5% SrO, 15% BaO, and 20% ZnO, and provided that if there is no BaO, then not less than 12.5% ZnO, and if there is no ZnO, then not less than 5% BaO; and the cladding consists essentially of a silicate glass having a refractive index which is at least 2% lower than the refractive index of the core glass, said cladding glass having a viscosity which is 0.5–2.0 times the viscosity of the core glass at a temperature at which the optical fiber is processed.

* * * * *